US008069216B2

(12) United States Patent
He et al.

(10) Patent No.: US 8,069,216 B2
(45) Date of Patent: Nov. 29, 2011

(54) METHOD AND APPARATUS FOR ALERTING NODES OF A MALICIOUS NODE IN A MOBILE AD-HOC COMMUNICATION SYSTEM

(75) Inventors: Wenbo He, Champaign, IL (US); Ying Huang, Urbana, IL (US); Klara Nahrstedt, Savoy, IL (US); Whay Chiou Lee, Cambridge, MA (US)

(73) Assignee: Motorola Solutions, Inc., Schaumburg, IL (US)

( * ) Notice: Subject to any disclaimer, the term of this patent is extended or adjusted under 35 U.S.C. 154(b) by 1360 days.

(21) Appl. No.: 11/608,452

(22) Filed: Dec. 8, 2006

(65) Prior Publication Data

US 2008/0140795 A1    Jun. 12, 2008

(51) Int. Cl.
*G06F 15/16* (2006.01)
(52) U.S. Cl. ........ 709/207; 709/204; 709/205; 709/224; 726/22; 726/23; 726/24; 380/44; 370/241; 370/252
(58) Field of Classification Search .......... 709/204–207; 726/22; 713/194
See application file for complete search history.

(56) References Cited

U.S. PATENT DOCUMENTS

| | | | | |
|---|---|---|---|---|
| 2002/0191584 A1* | 12/2002 | Korus et al. | ............... | 370/349 |
| 2003/0163729 A1* | 8/2003 | Buchegger | ............... | 713/201 |
| 2003/0204742 A1* | 10/2003 | Gupta et al. | ............... | 713/200 |
| 2004/0111632 A1* | 6/2004 | Halperin | ............... | 713/200 |
| 2004/0158455 A1* | 8/2004 | Spivack et al. | ............... | 704/9 |
| 2005/0141706 A1* | 6/2005 | Regli et al. | ............... | 380/44 |
| 2006/0133289 A1* | 6/2006 | Golle et al. | ............... | 370/252 |
| 2007/0094494 A1* | 4/2007 | Banerjee et al. | ............... | 713/157 |
| 2007/0277242 A1* | 11/2007 | Baker et al. | ............... | 726/25 |

OTHER PUBLICATIONS

Kirk A. Bradley, Steven Cheung, Nick Puketza, Biswanath Mukherjee, and Ronald A. Olsson. Detecting disruptive routers: A distributed network monitoring approach, Proceedings of the IEEE Symposium on Research in Security and Privacy (S & P 1998), pp. 115-124, May 1998.
John R. Hughes, Tuomas Aura, and Matt Bishop, "Using conservation of flow as a security mechanism in network protocols," Proceedings of the IEEE Symposium on Research in Security and Privacy (S & P 2000), pp. 131-132, May 14-17, 2000.
Sergio Marti, T.J. Giuli, Kevin Lai, and Mary Baker, "Mitigating Routing Misbehavior in Mobile Ad Hoc Networks," Mobicom 2000.
Jiejun Kong, Xiaoyan Hong, Yunjung Yi, JoonSang Park, Jun Liu, Mario Gerla, "A Secure Adhoc Routing Approach using Localized Selfhealing Communities," Proceedings of the ACM Symposium on Mobile Ad Hoc Networking and Computing (MobiHOC), Jun. 2005.
Brad Williams and Tracy Camp, "Comparison of Broadcasting Techniques for Mobile Ad Hoc Networks," MOBIHOC 2002.
Q. Li and D. Rus. "Sending messages to mobile users in disconnected ad-hoc wireless networks". In ACM MOBICOM, Aug. 2000.

(Continued)

*Primary Examiner* — Taghi Arani
*Assistant Examiner* — Jason Lee
(74) *Attorney, Agent, or Firm* — Randi L. Karpinia

(57) ABSTRACT

A method and apparatus for alerting nodes of a malicious node in a mobile ad-hoc communication system is provided herein. Particularly, a method and apparatus for distributing an alert message to nodes surrounding a recently discovered malicious node is provided. This alert technique further leverages mobility to distribute the alert message to a large majority of nodes in the ad hoc wireless network within a reasonable amount of time.

17 Claims, 4 Drawing Sheets

OTHER PUBLICATIONS

R. Shah, S. Roy, S. Jain, and W. Brunette. "Data MULEs: Modeling a three-tier architecture for sparse sensor networks," IEEE SNPA Workshop, 2003.

Wenrui Zhao, Mostafa Ammar and Ellen Zegura. "A Message Ferrying Approach for Data Delivery in Sparse Mobile Ad Hoc Networks," ACM International Symposium on Mobile Ad Hoc Networking and Computing, 2004.

PCT/US07/81713—PCT International Search Report with Written Opinion mailed Jun. 5, 2008—9 pages.

* cited by examiner

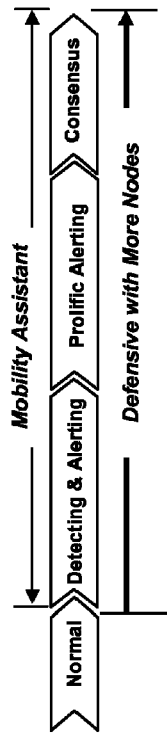
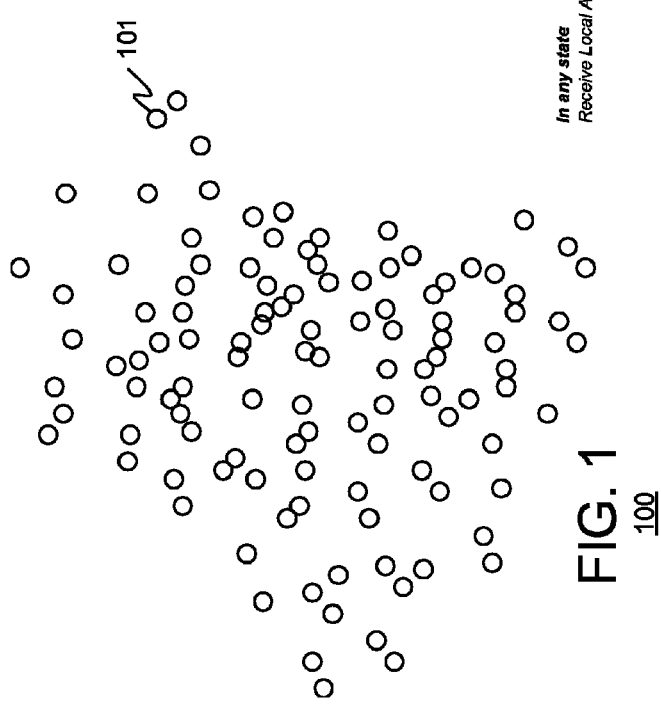
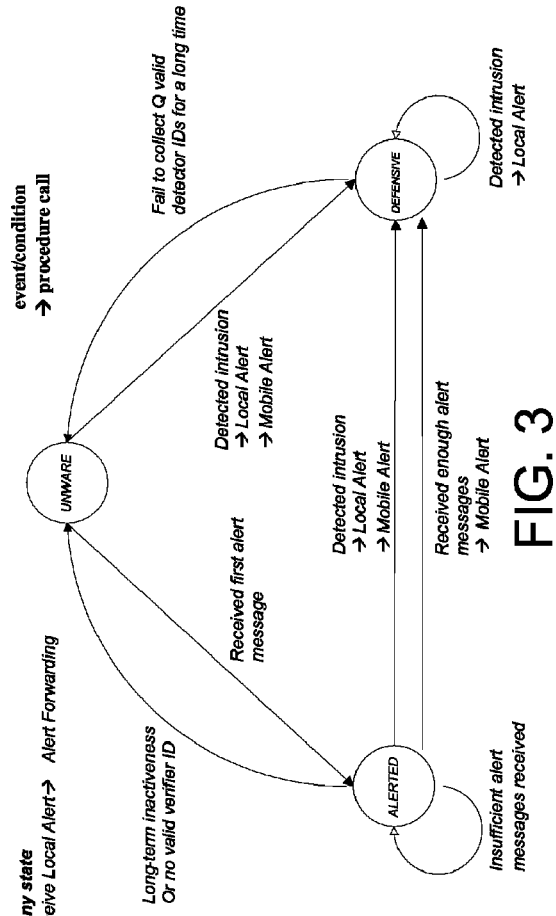

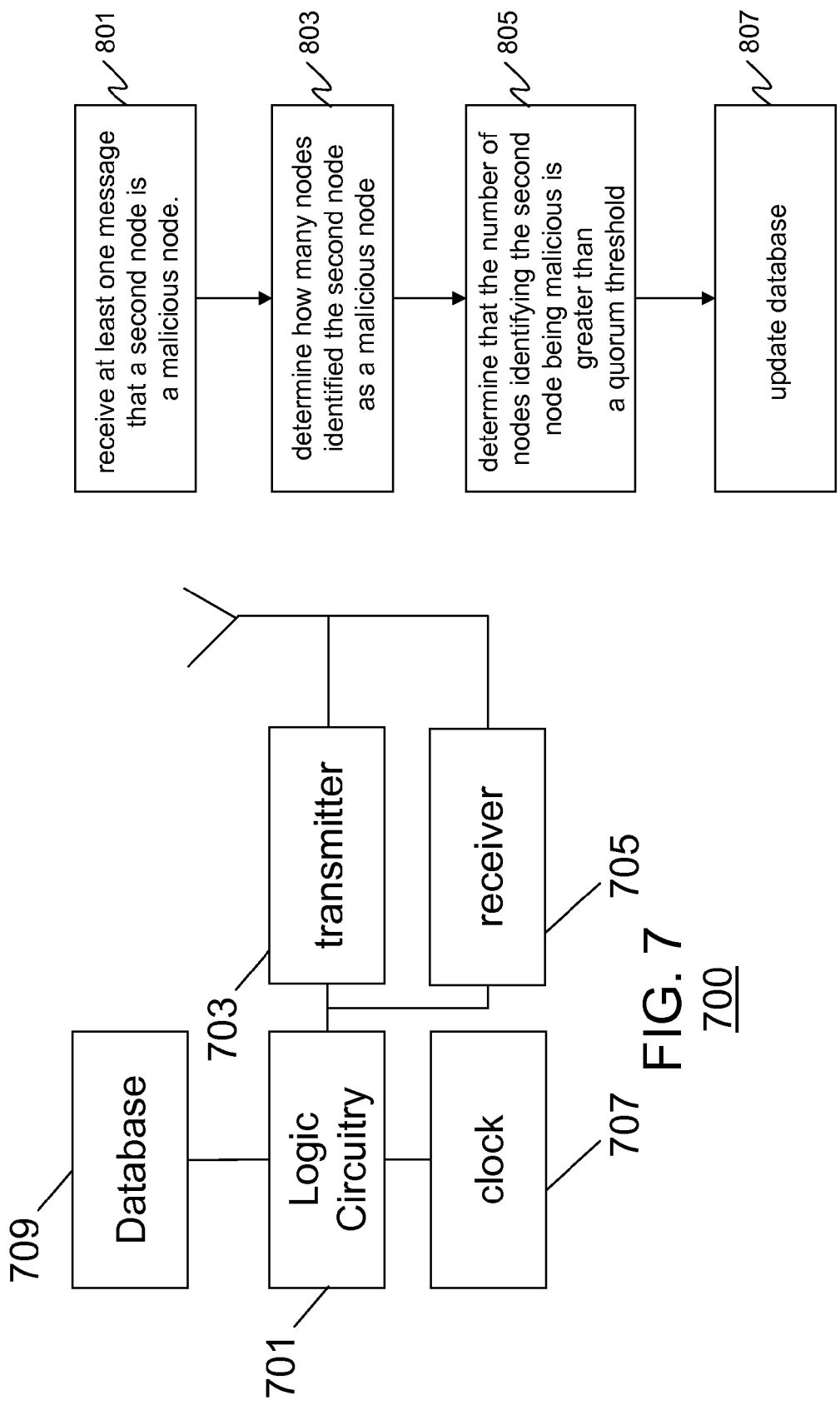

METHOD AND APPARATUS FOR ALERTING NODES OF A MALICIOUS NODE IN A MOBILE AD-HOC COMMUNICATION SYSTEM

FIELD OF THE INVENTION

The present invention relates generally to mobile ad-hoc communication systems and in particular, to a method and apparatus for alerting nodes of a malicious node in a mobile ad-hoc communication system.

BACKGROUND OF THE INVENTION

Mobile ad hoc wireless networks are vulnerable to active attacks by malicious nodes thanks to their open multiple access medium. These malicious nodes (or attackers) could degrade network performance and even deny legitimate nodes of service. For example, a malicious node may drop or tamper with routing control messages to cause erroneous packet delivery or degrade packet forwarding efficiency. A malicious node may also drop or tamper with user data packets to cause otherwise unnecessary packet retransmissions, such that the network could be overloaded with deliberately injected transmission overhead.

Security protection of a mobile ad hoc wireless network is particularly challenging due to mobility of both friendly and malicious nodes. Cryptographic methods can be used to strengthen data privacy and access control, but are unable to protect the network from malicious mishandling of packets. It would be beneficial if upon detecting an intrusion by a malicious node, a friendly node would alert other friendly nodes such that they could adapt their routing behavior to prevent/nullify future attacks by the malicious node. Therefore, a need exists for a method and apparatus for alerting nodes of a malicious node in a mobile ad-hoc communication system.

BRIEF DESCRIPTION OF THE DRAWINGS

FIG. 1 shows an example of a mobile ad-hoc communication system.

FIG. 2 illustrates network-wide evolution phases with respect to one instance of an alert against a particular attacker.

FIG. 3 shows a nodal state transition diagram, which comprises of three nodal states: Unaware, Alerted, and Defensive.

FIG. 7 is a block diagram of a node.

FIG. 8 is a flow chart showing operation of the node of FIG. 7 during identification of a second node as a malicious node.

DETAILED DESCRIPTION OF THE DRAWINGS

Figure 4:
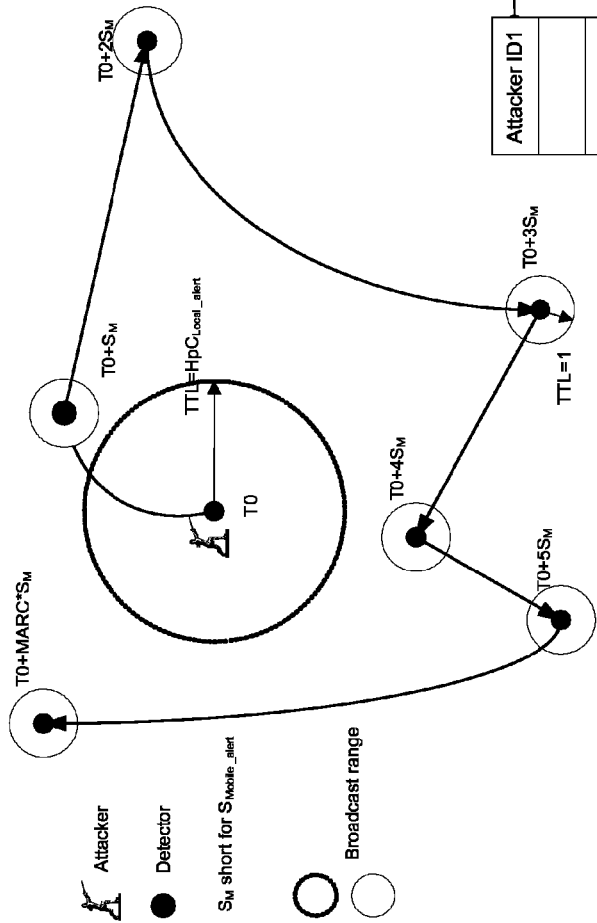
FIG. 4 illustrates how a mobile node propagates different alert messages.

In order to address the above-mentioned need, method and apparatus for alerting nodes of a malicious node in a mobile ad-hoc communication system is provided herein. Particularly, a method and apparatus for distributing an alert message to nodes surrounding a recently discovered malicious node is provided. This alert technique further leverages mobility to distribute the alert message to a large majority of nodes in the ad hoc wireless network within a reasonable amount of time.

The proposed method and apparatus are robust against a coordinated attack by a plurality of malicious nodes, which may coordinate to defame a friendly node. The proposed method and apparatus for propagating alert messages cannot be misused by an attacker to perform denial of service attacks. The method and apparatus also operates well in a mobile ad hoc wireless networks with uneven node density and dynamic network topology.

The present invention encompasses a method for a first node in a communication system to identify a second node as a malicious node. The method comprises the steps of receiving a message indicating that the second node is a malicious node, determining how many nodes identified the second node as the malicious node, and determining if a number of nodes identifying the second node as malicious is greater than a predetermined quorum threshold. The second node is identified as malicious when the number of nodes identifying the second node as malicious is greater than the quorum threshold.

The present invention additionally encompasses a method for a first node to alert other nodes in a mobile ad-hoc communication system of an attack by a second node. The method comprises the steps of detecting malicious activity by the second node, identifying the second node as malicious, and transmitting a first alert message, with a signature of the first node appended to it, to other nodes within a predetermined hop-count from the first node indicating detection of the presence of the malicious node. When the first node moves to a new location a second alert message will be transmitted (with a signature of the first node appended to it) to immediate neighboring nodes indicating the presence of the malicious node.

The present invention additionally encompasses a node comprising a receiver receiving a message indicating that a second node is a malicious node, and logic circuitry determining how many nodes identified the second node as the malicious node and determining if a number of nodes identifying the second node as malicious is greater than a predetermined quorum threshold, and identifying the second node as malicious when the number of nodes identifying the second node as malicious is greater than the quorum threshold.

Turning now to the drawings, wherein like numerals designate like components, FIG. 1 shows an example of a mobile ad-hoc communication system. Communication system 100 preferably utilizes a mobile ad-hoc communication system protocol defined by IEEE 802.15 Working Group for Wireless Personal Area Networks or IEEE 802.11 Working Group for Wireless Local Area Networks. However one of ordinary skill in the art will recognize that other wireless communication system protocols may be utilized without varying from the scope of the invention. Further, communication system 100 may utilize an ad-hoc routing protocol such as, but not limited to, Ad-hoc On Demand Distance Vector Routing (AODV), Dynamic Source Routing (DSR), and Temporally-Ordered Routing Algorithm (TORA). As shown, communication system 100 includes a number of nodes 101 (only one labeled in FIG. 1). Nodes 101 represent devices that communicate with each other through low-power, short range communication. While the present invention leverages mobility of nodes 101, it does not preclude scenarios wherein a subset of them are non-mobile.

As one of ordinary skill in the art will recognize, transmissions between two nodes 101 within communication system 100 generally take place through intervening nodes, with the intervening nodes receiving a source transmission, and repeating, or relaying the source transmission until the source transmission reaches its destination node. Thus, a first node, wishing to transmit information to a second node located outside the transmission range of the first node, will have its transmissions pass through intervening nodes.

As discussed above, a need exists for a method and apparatus for alerting nodes of a malicious node in mobile ad-hoc communication systems. In order to address this issue, an efficient method to distribute an alert message quickly to nodes surrounding a recently discovered malicious node is described below. The method described below further leverages the mobility of nodes to distribute the alert message to a large majority of nodes in the network within a reasonable amount of time. Specifically, the following mechanisms are employed:

(1) Local Alert: A detector (a friendly node that detects intrusion by a malicious node) broadcasts a local alert message (signed with its signature) to nearby neighbors (with respect to a predetermined propagation time-to-live (TTL)).

(2) Quorum-based Verification: To be protected against coordinated attacks, each friendly node may only become convinced that another node is a malicious node either by having directly detected intrusions by the malicious node or having received enough alert messages pertaining to the malicious node such that those messages confirm that a least a predetermined number (denoted Q) of other nodes have been similarly convinced.

(3) Alert Forwarding: Each friendly node, upon receiving a local alert message whose TTL value is greater than 1, forwards the message to its immediate neighbors, wherein the forwarded message is signed by the forwarding node only if it has been convinced that the node identified in the alert message is a malicious node and the message has been signed by fewer than Q nodes.

(4) Mobile Alert: Each friendly node that has become convinced that another node is a malicious node leverages its mobility to periodically send an alert message to its immediate neighbors as it moves around up to a number of periods.

(5) Neighborhood Watch: Each friendly node maintains a Neighborhood-watch cache to track malicious nodes identified in alert messages it has received.

(6) Blacklist Synchronization: Each friendly node periodically broadcasts a blacklist synchronization message to its immediate neighbors to synchronize network-wide awareness of all malicious nodes that the friendly node is convinced to be malicious.

Network-Wide Alert Phases

FIG. 2 illustrates network-wide evolution phases with respect to one instance of an alert against a particular attacker. At the beginning, every friendly node operates in a Normal phase. When a malicious node (referred to as an attacker) shows up and its intrusion is detected by one or more friendly nodes (referred to as detectors), the network enters a Detecting & Alerting phase, wherein two types of alert messages (local alert and mobile alert messages) are disseminated by the detectors around the network to warn other friendly nodes about the presence of the attacker. Local alert messages are broadcast within a neighborhood with a configurable "radius" of $HpC_{Local\_alert}$ (in terms of hop count). Simple flooding is employed in order to raise awareness and quickly surround the attacker with friendly nodes that are ready to execute appropriate actions against the attacker. Subsequently, as these friendly nodes move around, they leverage their mobility to warn other friendly nodes outside the immediate neighborhood where the attacker is first detected. Specifically, they periodically propagate mobile alert messages to their immediate neighbors up to a configurable Mobile Alert Retransmission Count (MARC) times.

Barring false detection, detectors trust one another, and begin to defend against each attacker that they have become aware of Note that before originating a local alert message or a mobile alert message against an attacker, a friendly node appends its signature to the message to authenticate its source of verification of the presence of the attacker. More particularly, a signature is a unique digital representation of an identity associated with an individual that is responsible for authenticating a given piece of information. A signature is generated by the individual using secret information. The signature can subsequently be verified by another individual utilizing an appropriate digital key, which is either in the public domain or provided by the individual who owns the aforementioned secret information.

The network next enters a Prolific Alerting phase, when friendly nodes that are not detectors begin to be convinced of the presence of an attacker after they have identified enough (with respect to a predetermined threshold Q) distinct verification signatures from received alert messages. Friendly nodes require such convincing to avoid collusive attacks by multiple attackers. Each friendly node that has become convinced of the presence of an attacker keeps track of the attacker by recording the attacker's ID (identity) in a blacklist, and begins to defend against the attacker. Incidentally, all friendly nodes that have directly detected the presence of the attacker are also considered convinced.

Finally, network 100 enters a Consensus phase, in which friendly nodes with non-empty blacklists exchange their blacklists periodically with their immediate neighbors, with a predetermined period $T_{Blacklist}$, to maintain global synchronization. Such synchronization is necessary to ensure that friendly nodes that newly join the network can become aware of presence of attackers, whose corresponding alert phases have already expired. Either on demand protocol or periodical synchronization protocol can be used to tradeoff levels of resilience against denial of service and broadcast traffic volume. When a blacklist synchronization message is received, it is processed as individual alerts.

FIG. 3 shows a nodal state transition diagram, which comprises of three nodal states: Unaware, Alerted, and Defensive. There are two main threads in the state and transition diagram; one for a detector, one for other alerted nodes. All the states are defined with respect to a single attacker.

All friendly nodes are in the Unaware state before the attacker is known by any of them. Upon detecting intrusion by an attacker, a detector (in any state) steps into the Defensive state and immediately begins to implement defensive actions against the attacker. While in this state, the detector first calls a local alert procedure, wherein local alert messages are disseminated within the local neighborhood. Upon completion of the local alert procedure, the detector calls a mobile alert procedure to disseminate alert outside the local neighborhood as it moves around.

Upon receiving a first alert message (local alert message, mobile alert message, or blacklist synchronization message), a friendly node enters the Alerted state. When enough valid verification signatures are accumulated by a friendly node in this state, the friendly node transfers to the Defensive state. It then starts to implement defensive actions against the attacker. Such defensive actions may include removing the attacker from routing consideration, and refusing to forward message from the attacker. Simultaneously, the friendly node carries out a mobile alert procedure to disseminate alert outside the local neighborhood as it moves around. While in the Alerted state, if the friendly node detects intrusion by the attacker directly, the friendly node moves into the Defensive state. While in the Defensive state, it is likely that an intrusion by the same attacker is observed again. In this case, the local alert procedure is executed but the mobile alert procedure is ignored since there is a high probability that a majority of nodes in the network have already become convinced of the presence of the attacker.

It is worth noting that intrusion detection in the Defensive state may be simplified because the identify of the attacker has already been widely verified by friendly nodes. Whenever the attacker sends out any packets using its compromised identity, its malicious attempt can be caught without any complicated traffic analysis.

In any state, if a friendly node receives a local alert message pertaining to the attacker, the friendly node executes an alert forwarding procedure. Incidentally, in any state, a friendly node executes a periodic blacklist synchronization process if its blacklist is non-empty. However, the blacklist may contain the ID of the pertinent attacker only when the friendly node is in the Defensive state.

The transitions from the Defensive state to the Unaware state is triggered when the nodes in defensive mode fails to collect enough detector information in a predetermined period of time. Such transitions allow the victim to be liberated from a blacklist, provided much fewer than Q friendly nodes have mistakenly verified the victim to be an attacker. Since at least Q intrusion detectors are required to trigger the system to transition into the Prolific Alerting phase, it is more reliable to use detector information to confirm presence of a known attacker, although indirect verification via signature accumulation is still desirable for the sake of expedition. Generally speaking, as long as an attacker continues to be active, and either the attacker moves around or its surrounding nodes keep changing due to mobility, it is likely that there will eventually be considerably more than Q detectors.

Even if the local topology around the attacker is static, the friendly nodes in the neighborhood will eventually be in the Defensive state. While a remote friendly node will be not affected even though it transition from the Defensive state to the Unaware state, in the event that it fails to collect at least Q detector signatures. Thus, each control message includes a detector field (or several detector fields in mobile alert message) to indicate whether a node sending or propagating the control message has detected intrusion by the pertinent malicious node directly. Transition from the Alerted state to the Defensive state are allowed through direct intrusion detection or based on a minimum of Q verifier signatures. However, the node may only remain in the Defensive state if it is able to collect verification signatures from Q detectors via subsequent blacklist synchronization messages and alert messages due subsequent detection. Thus, if the node fails to do so after a predetermined number of blacklist synchronization periods, it will transition from the Defensive state to the Unaware state. Note that the transition from the Alerted state to the Unaware state is allowed mainly for cache maintenance.

Table 1 summarizes system procedures and the blacklist synchronization process.

TABLE 1

Summary of System Procedures and Blacklist Synchronization Process

|  | Local Alert | Mobile Alert | Alert Forwarding | Blacklist Synchronization |
|---|---|---|---|---|
| Applicable nodal states | Defensive state | Defensive state | All | All |
| Trigger | Intrusion detection | A period $S_{Mobile\_alert}$ after being convinced of attacker's presence | Receipt of a local alert message | Non-empty blacklist |
| Verification signature | Detector signature appended | Own signature appended | Forwarder signature appended if fewer than Q valid signatures are indicated in the received message | Own signature appended |
| TTL | $HpC_{Local\_alert}$ | 1 | Decremented $HpC_{Local\_alert}$ | 1 |
| Periodic | No | Yes | No | Yes |
| Length of period | N/A | $S_{Mobile\_alert}$ | N/A | $T_{Blacklist}$ |
| Activity limit | N/A | Up to MARC periods | N/A | Unlimited, but may be affected by cache cleanup |
| Suppression | N/A | Yes (see notes below) | N/A | N/A |
| Message | Local Alert Message | Mobile Alert Message | Local Alert Message | Blacklist Synchronization Message |
| Message aggregation | N/A | Several mobile alert messages pertaining to different attackers may be aggregated in a single | N/A | N/A |

TABLE 1-continued

Summary of System Procedures and Blacklist Synchronization Process

| Local Alert | Mobile Alert | Alert Forwarding | Blacklist Synchronization |
|---|---|---|---|
| | mobile alert message | | |

Mobile Alert Suppression

For each node that a friendly node has been convinced to be an attacker, the friendly node (obviously in the Defensive state) executes a mobile alert procedure and maintains a variable (MARC) to track the remaining number of periods an ongoing mobile alert procedure pertaining to the attacker will be active. This variable, which is initially set by a detector to $MARC_d$, is updated by the friendly node whenever it learns of a MARC value that is lower than the one in its record. In addition, this variable is decremented by one every $S_{Mobile\_alert}$ period of time. The mobile alert procedure is stopped whenever the MARC value in record reaches 0. In this way, the lifetime of the two alerting phases is approximately bounded from above by $S_{Mobile\_alert} * MARC_d$ time. In addition, whenever the friendly node receives, within any period, enough messages collectively carrying Q distinct verification signatures of nodes that are convinced of the presence of an attacker, the next mobile alert message will be skipped. Note that several mobile alert messages pertaining to different attackers may be aggregated in a single mobile alert message; the aggregated mobile alert message may be suppressed only if all constituent mobile alert messages are to be suppressed.

Illustrative Example

FIG. 4 illustrates how a mobile node propagates different alert messages. Immediately after a friendly node detects an attacker at time $T_0$, it broadcasts a local alert with $TTL=HpC_{Local\_alert}$. The local alert reaches nodes in a neighborhood of $HpC_{Local\_alert}$ hops away from the detector very quickly. Then after a period of time $S_{Mobile\_alert}$, the detector moves to a new location, which is outside of the neighborhood reached by the local alert message. At this time, as the friendly node moves around, it begins to periodically propagate mobile alert messages (TTL=1) up to MARC times (MARC=6 in this example).

Control Messages

Figures 5, 9:
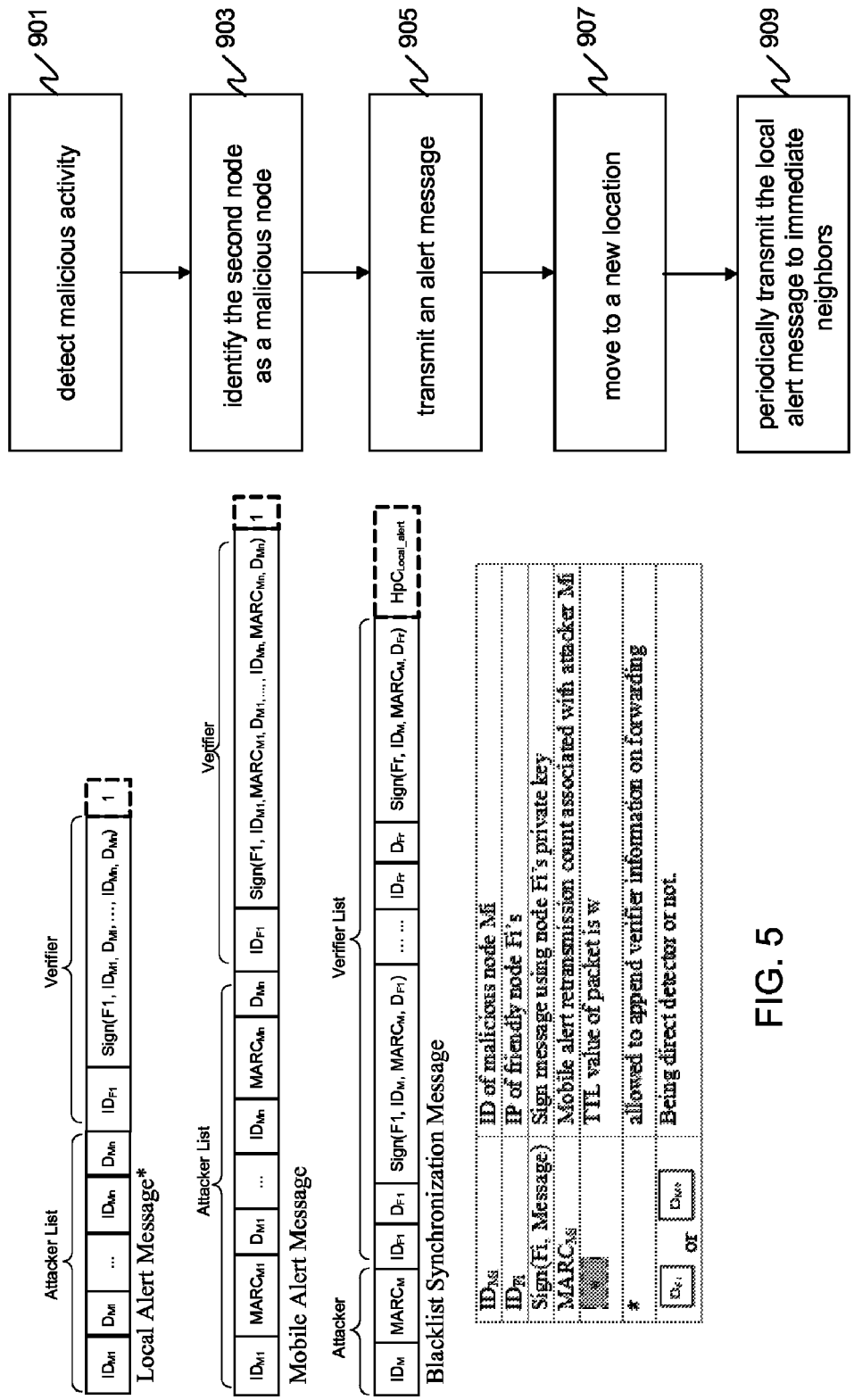
FIG. 5 illustrates the various control messages.
FIG. 9 is a flow chart showing operation of the node of FIG. 7 when the node determines the presence of a malicious node.

FIG. 5 illustrates the various control messages described above, and provides a summary of the terms used in various control messages. As one of ordinary skill in the art will recognize, the use of control messages within communication system 100 serve to facilitate information among the various nodes of the system.

As shown in FIG. 5, there are three types of control messages used for notifying nodes of malicious nodes, namely the local alert message, the mobile alert message, and the blacklist synchronization message. Each control message contains the identification of the malicious node. The local alert message and the mobile alert message additionally comprise a mobile alert retransmission count along with a verifier list. The verifier list comprises the identifications of the friendly nodes along with a field that indicates who signed the verifier list, along with their MARC value. In a similar manner, the blacklist synchronization message comprises an attacker field along with a verifier field. The verifier field comprises the identification of who is providing the blacklist synchronization message along with the nodes who signed off as verifying the node as an attacker.

Neighborhood-Watch Cache

Figure 6:
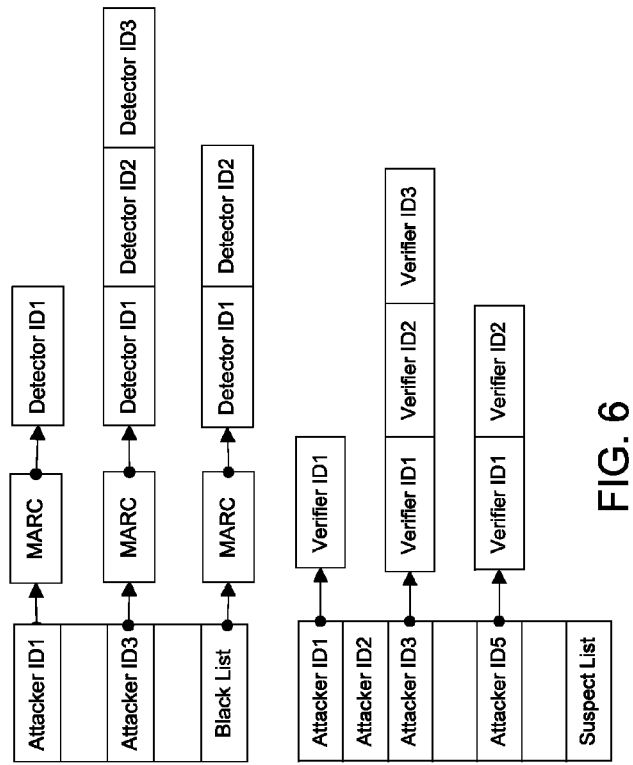
FIG. 6 illustrates organization of a neighborhood-watch cache.

The neighborhood-watch cache is organized as shown in FIG. 6. The information in the cache is saved within each node using internal memory. The cache comprises two parts: a blacklist and a suspect list. The blacklist includes confirmed attacker IDs as well as their MARC values and up to Q corresponding detector IDs. The suspect list contains unverified suspicious malicious node IDs, and up to Q corresponding verifier or detector IDs.

Whenever intrusion is detected or a control message (local alert message, mobile alert message, or blacklist synchronization message) is received by a friendly node, its neighborhood-watch cache is updated. When enough signatures are collected or intrusion is detected by the friendly node, it will move the pertinent attacker ID from its suspect list to its blacklist. In the suspect list, both detector IDs and verifier IDs are recorded; however detector IDs are given a higher priority than verifier ID to be recorded in face of insufficient memory space. While both verifier IDs and detector IDs are tracked in the suspect list, only detector IDs are tracked in the blacklist. This protects a victim against false verification by friendly nodes. Besides, complex data mining algorithm can be run on the detector information to detect attackers that exclusively perform defaming attacks. The idea is based on simple observation: mobile or static attackers are usually randomly distributed; the sets of detectors for different bad nodes are likely to vary a lot; assuming up to Q−1 collusive attackers, these attackers must be recorded as detectors in the blacklist in order to slander a victim. Hence, the sets of detectors for different defamed friendly nodes often overlap. In this respect, attackers can be readily identified if they repeatedly defame friendly nodes, even though they may not be performing any attack on packet forwarding.

The neighborhood-watch cache can be frequently screened to filter out false or obsolete information. For example, if a verifier ID is found in the blacklist, the verifier ID can be removed from the cache. Removal of last verifier ID for a suspect node erases it from the suspect list.

FIG. 7 is a block diagram of node 700 for utilization within communication system 100. As shown, node 700 comprises logic circuitry 701, database 709, transmitter 703, and receiver 705. Logic circuitry 701 preferably comprises a microprocessor controller such as, but not limited to a Freescale PowerPC microprocessor. Logic circuitry 701 serves as means for controlling node 700, and as means for analyzing message content to determine any actions needed.

Transmitter 703 and receiver 705 are common circuitry known in the art for communication utilizing a well known communication protocol, and serve as means for transmitting and receiving messages. For example, transmitter 703 and receiver 705 may utilize a mobile ad-hoc communication system protocol defined by IEEE 802.15 Working Group for Wireless Personal Area Networks or IEEE 802.11 Working Group for Wireless Local Area Networks. However one of ordinary skill in the art will recognize that transmitter 703 and receiver 705 may utilize other wireless communication system protocols without varying from the scope of the invention.

Finally, database 709 preferably comprises storage means such as but not limited to hard disk storage, random access memory, . . . , etc.

FIG. 8 is a flow chart showing operation of node 700 during identification of a second node as a malicious node. More particularly, the logic flow in FIG. 7 shows those steps taken by nodes when they receive messages identifying a node as a malicious node. The logic flow begins at step 801 where receiver 705 receives at least one message that a second node is a malicious node. As discussed above, the message may comprise a local alert message or a mobile alert message. As illustrated in FIG. 5, both messages comprise an attacker list. At step 803, logic circuitry 701 determines how many nodes identified the second node as a malicious node. This is accomplished by analyzing the message for a number of signed "verifiers". At step 805, a determination is then made by logic circuitry 701 that the number nodes identifying the second node as a malicious node is greater than a quorum threshold (Q). As discussed above, to be protected against coordinated attacks, each friendly node may only become convinced that another node is a malicious node either by having directly detected intrusions by the malicious node or having received enough alert messages pertaining to the malicious node such that those messages confirm that a least Q other nodes have been similarly convinced.

Finally, at step 807 logic circuitry 701 updates database 709. More particularly, as illustrated in FIG. 6, a "black list" and a "suspect" list of attackers is maintained. The "black list" comprises those nodes that have been identified as attackers, while the suspect list comprises those nodes that have had other nodes identify them as attackers.

As discussed above, logic circuitry may determine if a TTL for the received message is greater than a TTL threshold and re-transmit the message (via transmitter 703) if the TTL is greater than the threshold, decrementing the TTL by one. Additionally, the re-transmitted message will be signed by appending in the message a signature of node 700 before re-transmitting the message if the second node has been identified as a malicious node by node 700 and the number of nodes that have identified the node as a malicious node is less than a quorum threshold.

A periodic mobile alert message may be transmitted via transmitter 703 upon moving to a new location. The message will have a signature of node 700 appended to it, and will be transmitted to neighboring nodes. The mobile alert message will indicate node 700 has determined that the number of nodes identifying the second node as malicious is greater than the quorum threshold, or that node 700 has directly detected malicious behavior by the second node. It should be noted that a "new location" may be based on logic circuitry 701 determining that node 700 is beyond a predetermined hop-count from its last location. The steps of periodically transmitting the mobile alert message upon moving may be repeated up to a predetermined number of times.

As mentioned above, logic circuitry 701 will maintain a cache of all identified malicious nodes in database 709. Logic circuitry 701 may also instruct transmitter 703 to periodically broadcast a blacklist synchronization message to neighboring nodes. Additionally, receiver 705 may as well as periodically receiving blacklist synchronization messages from other nodes. Upon receiving a blacklist synchronization message from another node, logic circuitry 701 will update the cache to include those nodes identified as malicious by other nodes.

FIG. 9 is a flow chart showing operation of the node of FIG. 7. Particularly, the logic flow in FIG. 9 shows those steps taken by node 700 when node 700 detects the presence of a malicious node. This detection is made directly by logic circuitry 701 directly detecting the presence of a malicious node. The direct detection would comprise detecting that a malicious node is dropping or tampering with routing control messages to cause erroneous packet delivery or degrading packet forwarding efficiency. The direct detection may also include detecting that a malicious node is dropping or tampering with user data packets to cause otherwise unnecessary packet retransmissions.

Regardless of the detection technique, the logic flow begins at step 901 where logic circuitry 701 detects the malicious activity by a second node. At step 903 logic circuitry identifies the second node as malicious and instructs transmitter 703 to transmit an alert message (step 905), with a signature of node 700 appended to it, to other nodes within a predetermined hop-count from node 700. The message indicates detection of the presence of the malicious node.

At step 907 node 700 moves to a new location and periodically transmits (via transmitter 703) the local alert message to immediate neighbors (step 907). As discussed above, the new location is beyond a predetermined hop-count from the original location of the first node. The step of moving to a new location and re-transmitting the alert message may be repeated periodically up to a predetermined number of times.

As discussed above, logic circuitry 701 will maintain a cache of all identified malicious nodes in database 709. Logic circuitry 701 may also instruct transmitter 703 to periodically broadcast a blacklist synchronization message to neighboring nodes. Additionally, receiver 705 may as well as periodically receiving blacklist synchronization messages from other nodes. Upon receiving a blacklist synchronization message from another node, logic circuitry 701 will update the cache to include those nodes identified as malicious by other nodes.

It should be noted that the direct detection that a node is a malicious node may be accomplished via several known detection schemes. For example, a node on a certain packet forwarding path may monitor packet handling behavior of a downstream node, such that its tampering or dropping of any packet can be detected.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a first node to alert other nodes of a malicious node in a communication system, the method comprising:
   receiving, by the first node, a message indicating that a second node is the malicious node;
   determining, by the first node, a quantity of nodes identifying the second node as the malicious node;
   comparing, by the first node, the quantity of nodes identifying the second node as malicious to a predetermined quorum threshold;
   identifying, by the first node, the second node as malicious when the quantity of nodes identifying the second node as malicious is greater than the predetermined quorum threshold;
   re-transmitting, by the first node, the message to other nodes within a predetermined hop-count from the first node indicating that the second node is the malicious node;
   moving, by the first node, to a new location; and
   transmitting, by the first node, a mobile alert message upon moving to a new location, with a signature of the first node appended to it, to immediate neighboring nodes indicating that the first node has determined that the quantity of nodes identifying the second node as malicious is greater than the predetermined quorum threshold.

2. The method of claim 1 wherein the determination of the quantity of nodes identifying the second node as malicious is based on a number of distinct signatures contained in message.

3. The method of claim 1 further comprising:
determining, by the first node, upon receiving the message, if a time-to-live (TTL) for the message is greater than a TTL threshold;
re-transmitting, by the first node, the message if the TTL is greater than the TTL threshold.

4. The method of claim 3 further comprising:
appending, by the first node, in the message a signature of the first node before re-transmitting the message if the message contains a number of signatures of other nodes less than the predetermined quorum threshold and the first node has identified the second node as malicious.

5. The method of claim 1 wherein the new location is beyond the predetermined hop-count from a last location of the first node.

6. The method of claim 1 wherein the operations of claim 1 are repeated periodically up to a predetermined number of times.

7. The method of claim 1 further comprising:
maintaining, by the first node, in a cache of all identified malicious nodes; and
periodically sending, by the first node, a blacklist containing the list to immediate neighboring nodes.

8. The method of claim 7 further comprising:
updating, by the first node, the cache upon receiving a blacklist containing a list of malicious nodes from a neighboring node.

9. A method for a first node to alert other nodes in a mobile ad-hoc communication system of an attack by a second node, the method comprising:
detecting, by the first node, a malicious activity by the second node;
identifying, by the first node, the second node as malicious;
transmitting, by the first node, a first alert message, with a signature of the first node appended to it, to other nodes within a predetermined hop-count from the first node indicating detection of the presence of the malicious node;
moving, by the first node, to a new location; and
transmitting, by the first node, a second alert message upon moving to the new location, with a signature of the first node appended to it, to immediate neighboring nodes indicating the presence of the malicious node, wherein the operation of moving to the new location and transmitting the second alert message are repeated periodically up to a predetermined number of times.

10. The method of claim 9 wherein the new location is beyond the predetermined hop-count from the original location of the first node.

11. The method of claim 9 further comprising:
maintaining, by the first node, in a cache of all identified malicious nodes; and
periodically sending, by the first node, a blacklist message containing the identified malicious nodes to immediate neighboring nodes.

12. The method of claim 11 further comprising:
updating, by the first node, the cache upon receiving a blacklist message containing a list of malicious nodes from a neighboring node.

13. A node comprising:
a receiver receiving a message indicating that a second node is a malicious node;
logic circuitry determining a quantity of nodes identifying the second node as the malicious node and comparing the quantity of nodes identifying the second node as malicious to a predetermined quorum threshold, and identifying the second node as malicious when the quantity of nodes identifying the second node as malicious is greater than the predetermined quorum threshold; and
a transmitter re-transmitting the message to other nodes within a predetermined hop-count from the node indicating that the second node is the malicious node and transmitting a mobile alert message, with a signature of the node appended to it, to immediate neighboring nodes indicating that the node has determined that the quantity of nodes identifying the second node as malicious is greater than the predetermined quorum threshold upon the node moving to a new location.

14. The node of claim 13 wherein the determination of the quantity of nodes identifying the second node as malicious is based on a number of distinct signatures contained in the message.

15. The node of claim 13 wherein the logic circuitry additionally determines if a time-to-live (TTL) for the message is greater than a TTL threshold, and instructs the transmitter to re-transmit the message if the TTL is greater than the TTL threshold.

16. The node of claim 15 wherein a signature of the node is appended to the message before re-transmitting the message if the message contains a number of signatures of other nodes less than the quorum threshold and the node has identified the second node as malicious.

17. The node of claim 13 wherein the new location is beyond the predetermined hop-count from the original location of the node.

* * * * *

UNITED STATES PATENT AND TRADEMARK OFFICE
CERTIFICATE OF CORRECTION

| | | |
|---|---|---|
| PATENT NO. | : 8,069,216 B2 | Page 1 of 1 |
| APPLICATION NO. | : 11/608452 | |
| DATED | : November 29, 2011 | |
| INVENTOR(S) | : He et al. | |

It is certified that error appears in the above-identified patent and that said Letters Patent is hereby corrected as shown below:

In Fig. 3, Sheet 1 of 4, delete "UNWARE" and insert -- UNAWARE --, therefor.

Signed and Sealed this
Fourth Day of December, 2012

David J. Kappos
*Director of the United States Patent and Trademark Office*